United States Patent
Reiche

(10) Patent No.: US 9,838,579 B2
(45) Date of Patent: Dec. 5, 2017

(54) METHOD FOR PRODUCING A CAMERA, AND A CAMERA FOR A VEHICLE

(71) Applicant: Robert Bosch GmbH, Stuttgart (DE)

(72) Inventor: Martin Reiche, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 218 days.

(21) Appl. No.: 14/740,497

(22) Filed: Jun. 16, 2015

(65) Prior Publication Data

US 2015/0373241 A1    Dec. 24, 2015

(30) Foreign Application Priority Data

Jun. 20, 2014   (DE) .................. 10 2014 211 879

(51) Int. Cl.
  *H04N 5/225*   (2006.01)
  *H04N 17/00*   (2006.01)
  *G02B 27/62*   (2006.01)

(52) U.S. Cl.
  CPC ......... *H04N 5/2254* (2013.01); *H04N 5/2253* (2013.01); *H04N 5/2257* (2013.01); *H04N 17/002* (2013.01); *G02B 27/62* (2013.01); *Y10T 29/49131* (2015.01)

(58) Field of Classification Search
  CPC .. H04N 5/2253; H04N 5/2254; H04N 5/2257; H04N 17/002; Y10T 29/49131; H01L 27/14618; H01L 27/14634; G02B 7/023; G02B 27/62
  See application file for complete search history.

(56) References Cited

U.S. PATENT DOCUMENTS

| 2005/0073017 A1* | 4/2005 | Kim ................. H01L 27/14618 257/433 |
| 2011/0205357 A1* | 8/2011 | Imamura ................ G01C 3/085 348/135 |
| 2011/0304930 A1* | 12/2011 | Welch ............... H01L 27/14618 359/796 |
| 2012/0141114 A1* | 6/2012 | Gooi ...................... G03B 17/12 396/529 |

(Continued)

FOREIGN PATENT DOCUMENTS

| JP | 2008113060 A | * | 5/2008 | |
| KR | 20110022936 A | * | 3/2011 | |
| KR | WO 2013187620 A1 | * | 12/2013 | ............... G03B 5/00 |

*Primary Examiner* — Dennis Hogue
(74) *Attorney, Agent, or Firm* — Norton Rose Fulbright US LLP; Gerard Messina

(57) ABSTRACT

A method for producing a camera includes: mounting an image sensor on a circuit carrier and contacting with a power device for recording image signals of the image sensor; measuring an objective while ascertaining a tilting angle of its optical axis in terms of an amount and azimuth; providing an objective holder having a tube and locating pins; placing the objective holder with its locating pins on at least one of the circuit carrier and the image sensor; inserting the objective in a specified rotational position or at an azimuth angle into the tube as a function of the ascertained tilting angle; and adjusting the focus. An axis of symmetry of the tube of the objective holder has a counter-tilting angle with respect to a surface normal of the image sensor, which is the opposite of the ascertained tilting angle or the image shell tilting of the objective.

17 Claims, 3 Drawing Sheets

(56) References Cited

U.S. PATENT DOCUMENTS

2013/0047396 A1* 2/2013 Au .................. B23Q 17/22
 29/407.09
2013/0242182 A1* 9/2013 Rudmann ............. G02B 7/021
 348/374

* cited by examiner

METHOD FOR PRODUCING A CAMERA, AND A CAMERA FOR A VEHICLE

BACKGROUND OF THE INVENTION

1. Field of the Invention

The present invention relates to a camera having a circuit carrier on which an objective holder is mounted.

2. Description of the Related Art

As a rule, cameras for vehicles have a circuit carrier on which an objective holder is mounted, which in turn holds an objective. The objective generally includes a lens barrel made of plastic, for instance, and multiple lenses inside the lens barrel, which are set apart by spacers. In addition, an image sensor is indirectly mounted via a sensor support, or also directly on the circuit carrier. The direct mounting of the image sensor is also known as COB (chip on board).

The image sensor has a sensor surface which constitutes the image plane. For proper alignment, an objective axis, i.e., an axis of symmetry of the objective, is to coincide with a surface normal of the sensor surface that sits perpendicularly on the sensor surface, so that the objective axis and the surface normal constitute the optical axis of the camera. Focusing therefore takes place along the optical axis.

Angular tilting between the objective axis and the surface normal leads to a corresponding loss in depth of focus in the particular sectors at the edge of the sensor surface that are shifted out of an ideal focus, and thus at the edge of the image as well. These sectors become myopic or hyperopic. This has a negative effect on the achievable yield in the production since such cameras operate unreliably and may have to be scrapped.

In addition to connection and production tolerances in the production of the camera, the angular tilting of the optical axis with respect to the surface normal also results from a tilting angle of the objective, which, for example, may be caused by tolerance-related shifting or tilting of individual lenses of the objective in relation to each other. This tilting is a variable that characterizes an objective and is also measurable and able to be compensated again by corresponding counter-tilting of the objective. The tilting may be referred to as image shell tilting, since a real object is generally imaged to an image shell (instead of the image plane of the ideal object).

For an adjustment of such counter-tilting it is known to carry out an active alignment during the production process, once the objective holder has been mounted on the circuit carrier; during such an adjustment images of the image sensor of measured objects are read out and their focus is evaluated. The objective is then tilted in its angular position relative to the image sensor until the objective axis essentially lies on the surface normal of the image sensor again and the recorded image is in focus in the edge regions as well, whereupon the configuration is fixated, e.g., by bonding or soldering.

Such a method is performed in multiple steps and requires time and work, since an adjustment and evaluation in all angular and translatory directions (6-axes alignment) takes place.

BRIEF SUMMARY OF THE INVENTION

The camera according to the present invention has a circuit carrier, e.g., a steel plate, an objective holder including a tube and locating pins, an image sensor (imager chip) mounted on the circuit carrier, and an objective accommodated in the objective holder, the objective holder resting via its locating pins on the image sensor surface or the circuit carrier (substrate).

Three locating pins are advantageously provided for this purpose, since a plane is basically defined by three points and the three locating pins, which are spaced apart by 120 degrees, for example, ensure a defined seat on the circuit carrier (substrate) or the sensor surface.

The present invention is based on the idea of compensating for the image shell tilting or the tilting of the objective axis by counter-tilting of the objective holder with the aid of locating pins, the locating pins projecting from a lower holder area of the objective holder to the image sensor or circuit carrier, i.e., in the downward direction, and preferably have different lengths, so that they enable the counter-tilting for compensating the tilting or the image shell tilting. It is advantageously provided to already supply objective holders with different locating pins and thus different counter-tilting angles, so that the different objective holders are suitable for compensating for objectives that exhibit different image shell tilting.

It is therefore possible to classify or categorize objectives based on their specific image shell tilting and to provide individually suitable objective holders for these classes or categories. The objective can therefore be measured after its production and be used together with a suitable objective holder of the associated category or class to build a camera, based on its image shell tilting (tilting angle), which may occur during the production for tolerance-related reasons as a result of slight tilting between the individual lenses.

A few advantages therefore result:

A rapid and uncomplicated assembly, and thus production, of the camera in terms of process technology is possible. An objective holder of the class or category provided therefor is selected for an objective of a specific class, a rotation position (azimuth angle) on the objective and the objective holder advantageously being specified by a mark or a similar means in order to define the angular position (azimuth angle) between them.

This advantageously makes it possible to manage without an active alignment during the assembly process, which provides considerable savings in terms of time and money. Also dispensed with are additional measuring and adjustment systems for the relative adjustment of the components and for the measurements taking place between the adjustment steps that are required in an active alignment.

Since hot-pressing or deforming of regions of the object holder during the production is not required either, no relevant material stressing occurs in the course of the production process. The production takes place in a cost-effective and rapid manner.

The locating pins require no relevant additional material expense; they can be produced in a defined manner in the different lengths. Developing the locating pins at different lengths, i.e., deviations among the three locating pins in order to produce the counter-tilting, can take place directly in an integral development of the objective holder, e.g., using an injection molding process, or by first producing the objective holder in one piece with its standard pins, e.g., pins having the same length, which are subsequently shortened appropriately in order to produce the objective holders of different classes or categories, for example by removing material (machining, milling, grinding) or hot-pressing or stamping. The objective holders thus formed using differently developed locating pins, for instance, are then held in store as objective holders of the various classes or categories.

In the production, an appropriate objective holder for an objective of a particular class can therefore be selected from an assortment, for example, and installed.

The number of classes, and thus the fine graduations in compensating for the tilting or the image shell tilting, may be realized according to the required image quality. For example, tilting angle ranges of the objectives are able to be assigned to the objective holders of one class, so that each objective featuring a specific tilting angle (image shell tilting) is assigned to precisely one class.

The tilting is advantageously defined by tilting angles and azimuth angles, so that an objective holder featuring these suitable values is assigned to each objective. As an alternative, it is also possible to specify only the tilting angle, and to adjust the azimuth by the relative rotation of the objective with respect to the image sensor, for example by inserting the objective into the tube of the objective holder using a suitable rotational position (azimuth angle). For the compensation, an appropriate azimuth angle must therefore be set between a mark of the objective that is used for specifying its azimuth angles, and a corresponding mark on the objective holder. Only objective holders featuring different tilting angles must therefore be classified, since the azimuth angle is to be adjusted during the assembly.

Focusing takes place by a longitudinal adjustment of the objective in the tube of the objective holder, as known per se, advantageously while recording a test pattern and analyzing the image signals from the image sensor.

The camera and its production method are particularly suitable also for COB techniques, i.e., chip-on-board mounting of the image sensor (imager chip) on the circuit carrier (substrate), since no chip housing that can be aligned or tilted is generally provided in such developments. Via its locating pins, the objective holder may be placed directly on the circuit carrier (substrate), which may be a steel plate (stiffener), for example; however, the locating pins may furthermore also be placed directly on the image sensor or its sensor surface, outside its sensitive region or the pixel matrix.

The steps of the production method according to the present invention may basically be varied in their sequence; for example, the objective is measured independently of the production of the other components, and the assembly and contacting of the image sensor on the circuit carrier also takes place independently thereof, so that these steps may be switched in their sequence. In general, for example, it is also possible to first insert the objective into the tube of the objective holder and then to place the objective holder via its locating pin onto the circuit carrier or image sensor.

DETAILED DESCRIPTION OF THE INVENTION

Figure 1:
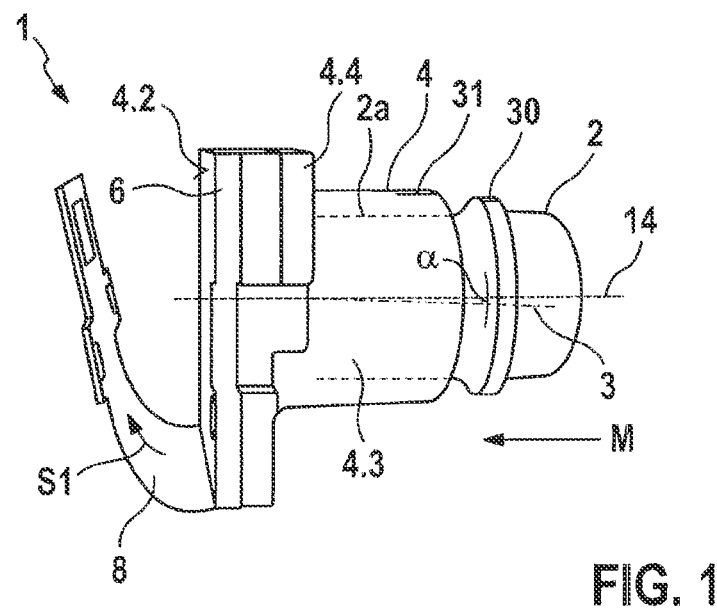
FIG. 1 shows a camera according to one specific embodiment of the present invention.
Figure 2:
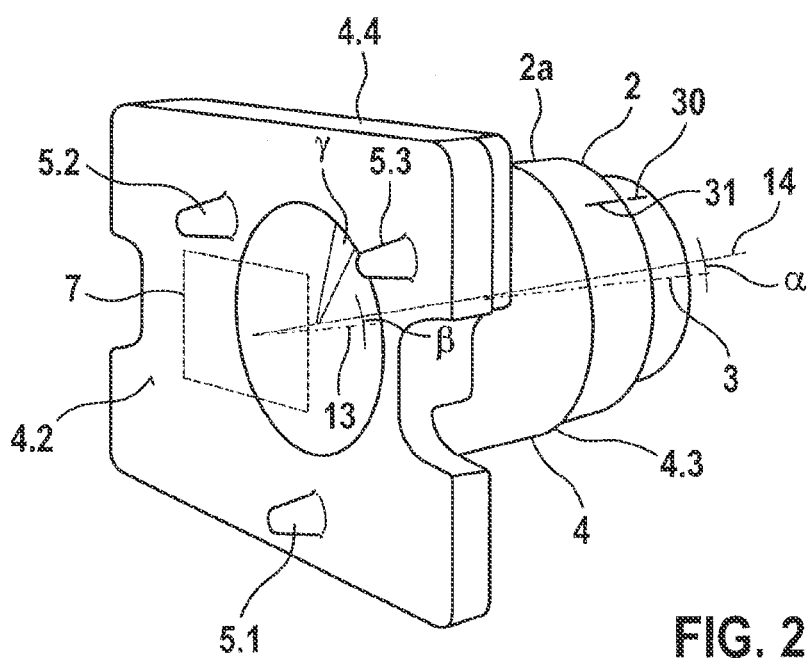
FIG. 2 shows the objective holder with the objective of the specific embodiment in a perspective view from behind, with a sketched image sensor.
Figure 3:
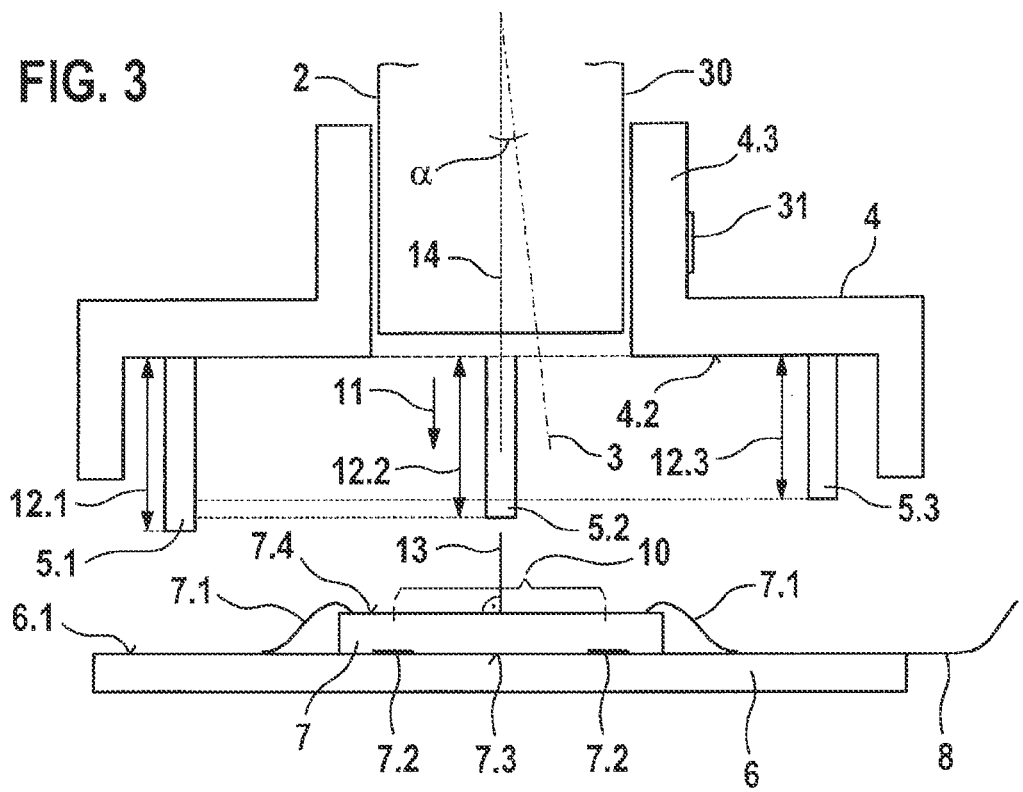
FIG. 3 shows a step prior to placing the objective holder on the circuit carrier.

FIG. 1 shows a camera 1, which includes a circuit carrier 6 (support device, substrate), which is developed as a metal plate (stiffener) in this instance, an objective holder 4, an objective 2, an image sensor 7, and a flexible conduction band 8. Objective holder 4 is developed in one piece, e.g., as an injection-molded plastic component, and has a tube 4.3 and a lower retaining region 4.4 adjoining tube 4.3; it also includes locating pins 5.1, 5.2, and 5.3 on an underside 4.2 of retaining region 4.4, which project toward below, that is to say, to the left in FIGS. 1 and 2. Objective 2 is developed in the conventional manner, for instance including a lens barrel 2a, as well as lenses, which are spaced apart from each other via spacer rings and accommodated in the lens barrel, the lens barrel not being shown further here.

Image sensor 7 is mounted, e.g., bonded, on a circuit carrier surface 6.1 via its underside 7.3. In the process, image sensor 7 may also be attached to flexible conduction band 8, such as bonded, which is subsequently bonded to circuit carrier surface 6.1. Image sensor 7 thus points toward objective 2 with its upper side 7.4, and a sensitive region 10 (imager surface) is developed on top side 7.4, e.g., in the conventional manner as a matrix setup of image pixels. Via wire bonds 7.1 and/or chip bonds 7.2 developed on its underside 7.3, image sensor 7 is in contact with flexible conduction band 8, so that it is able to output image signals S1 via flexible conduction band 8 for further analysis.

Objective holder 4 is mounted with the aid of its locating pins 5.1, 5.2 and 5.3; according to the specific embodiment illustrated, objective holder 4 is mounted on circuit carrier surface 6.1 by its locating pins 5.1, 5.2, and 5.3. As an alternative, it is basically also possible to place locating pins 5.1, 5.2, and 5.3 on top side 7.4 of image sensor 7, i.e., laterally outside sensitive region 10.

For a satisfactory alignment that provides high image definition, a compensation of tilting takes place on the one hand, and focusing on the other. The focusing is implemented in the usual manner by adjusting objective 2 in tube 4.3 in its length, i.e., an adjustment in assembly direction M of FIG. 1, which thus corresponds to an axis of symmetry 14 of tube 4.

To analyze the image definition on account of the image shell tilting or tilting, the axes of symmetry must be considered:

Tube 4 has an axis of symmetry 14.

Objective 2 has an optical axis 3, which generally does not extend in parallel with lens barrel 2a. Optical axis 3 in particular may be defined by tolerances in the assembly of objective 2 together with outer lens barrel 2a and inner spacer rings and lenses, in addition to possible lens errors. As a result, optical axis 3 of objective 2 generally does not run parallel to lens barrel 2a or its outer surface or axis of symmetry.

Image sensor 7 has a surface normal 13, which stands perpendicularly on sensitive region 10 of sensor surface 7.4.

In an optimal alignment, these three axes or straight lines, i.e., axis of symmetry 14, optical axis 3, and surface normal 13, coincide. Slight lateral deviations generally lead only to imaging of the image on sensitive region 10 at a corresponding lateral shift, which normally is not particularly relevant, especially when detecting a vehicle environment. Focusing, i.e., the relative position in the longitudinal direction, is likewise not very problematic and achieved by a longitudinal adjustment of objective 2 inside tube 4.3, especially in the usual manner by detecting a test pattern or reference pattern and analyzing image signals S1 in an evaluation device, while longitudinally shifting objective 2 in objective holder 4.

A particular problem thus is tilting of axes 3, 14, and 17 with respect to each other. For instance, objective 2, in particular, generally exhibits tilting or image shell tilting, which manifests itself as tilting angle α of its optical axis 3 with respect to its lens barrel 2a or axis of symmetry 14 of tube 4.3; here, tilting angle alpha between optical axis 3 and the axis of symmetry of tube 4.3 may be used for the further consideration inasmuch it is this deviation that must ultimately be corrected, and the guidance of lens barrel 2a in tube 4.3 is very precise, for example with the aid of pressure ribs developed in the inner surface of tube 4.3.

To compensate for tilting angle α (image shell tilting), tilting or counter-tilting of objective holder 4 on the unit made up of circuit carrier 6 with accommodated image sensor 7 takes place; according to the specific embodiment illustrated, this is done by counter-tilting on circuit carrier 6. To do so, locating pins 5.1, 5.2, and 5.3 of objective holder 4 are developed in different pin lengths 12.1, 12.2, and 12.3, so that their contact surfaces 18.1, 18.2, and 18.3 have different clearances from underside 4.2 of holder region 4 and make contact on circuit carrier surface 6.2. Because of the different pin lengths 12.1, 12.2, and 12.3, basically any tilting angle α can be compensated both in terms of size and its position, i.e., the azimuth angle γ (gamma) or the torsional position about axis of symmetry 14.

Axis of symmetry 14 of tubular region 4 therefore is tilted at a counter-tilting angle β with respect to surface normal 13 of image sensor 7, so that tilting angle α of optical axis 3 of objective 2 inside tube 4 is compensated entirely or to a large extent, i.e., within a tolerance T; in other words, β corresponds to tilting angle α in terms of its amount and azimuth angle γ (azimuth position or angular position or rotational position), i.e., β is meant to essentially represent −α.

In a complete compensation, optical axis 3 thus extends parallel to surface normal 13 within a tolerance T; given a corresponding lateral position, they come to lie entirely or largely within each other.

The development of locating pins 5.1, 5.2, and 5.3 at different lengths already takes place in advance, rather than on a measuring stand when measuring the image errors, for instance. Instead, especially in a production method, multiple objective holders 4 of this type featuring different counter-tilting angles β may be developed, and appropriate allocations be made after objective 2 has been measured during its production. Objectives 2 may be categorized or classified following their production and measurement, in particular, using a multitude of classes K1, K2, K3, . . . , either solely according to the size of tilting angle α or also according to the size of tilting angle α and its azimuth γ (gamma). To define azimuth angle γ, a mark 30, which is only sketched here, is provided on objective 2, such as its lens barrel 2a. Accordingly, holder 4 has a counter-mark 31, so that in a categorization that uses azimuth angle γ, mark 30 and counter-mark 31 are made to agree during the assembly, and in a categorization without azimuth angle γ, azimuth angle γ is appropriately adjusted between mark 30 and counter-mark 31 during the assembly. In this way a correct azimuth position, and thus a compensation of tilting angle α and counter-tilting angle β, results in each case, rather than a geometric addition of these values, for instance. It is also possible that counter-mark 31 has already been developed by a suitable reference point such as, for instance, a visual edge or similar device of objective holder 4.

The plurality of objective holders 4 are appropriately categorized or classified by developing their individual locating pins 5.1, 5.2, and 5.3 with suitable, different pin lengths 12.1, 12.2, and 12.3 in accordance with tilting angles α.

In principle, the different pin lengths 12.1, 12.2, and 12.3 of locating pins 5.1, 5.2, and 5.3 may already be developed during the injection-molding production process; however, a uniform objective holder 4 having standard pins 105.1, 105.2, and 105.3 is advantageously developed to begin with, the pins having the same standard length 112, so that standard pins 105.1, 105.2, and 105.3 are subsequently adjusted in their length by selective shortening. For example, this shortening may be accomplished by material-removal or machining, i.e., by grinding or milling the individual standard pins 105.1, 105.2, and 105.3.

Figure 4:
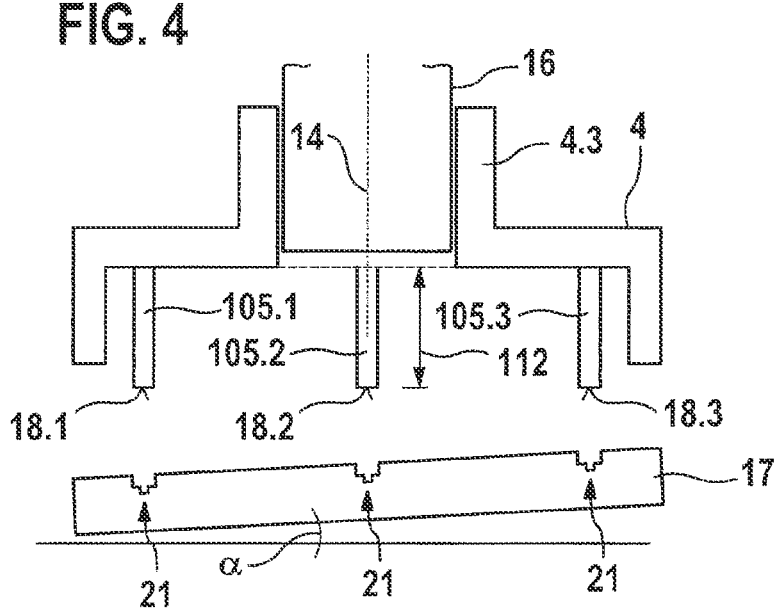
FIG. 4 shows the development of the locating pins from standard pins according to one specific embodiment, using hot-pressing.
Figure 5:
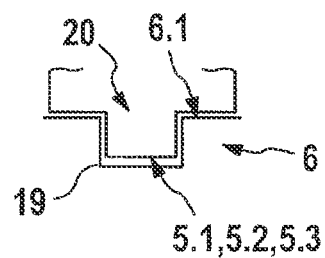
FIG. 5 shows the locating pins developed according to FIG. 4.

As an alternative to material removal, the length shortening may be achieved by hot-pressing or stamping, i.e., by way of deformation. This is illustrated in FIGS. 4 and 5. A guide tool 16 is inserted into tube 4.3 of objective holder 4, whereupon guide tool 16 is tilted by counter-tilting angle β relative to a deformation tool 17, e.g., a heated stamping plate or hot pressing plate. To do so, it is possible to tilt deformation tool 17, as shown in FIG. 4, or vice versa. The deformation tool in particular may include three stamping depressions 21 for forming the three locating pins 5.1, 5.2, and 5.3. Guide tool 16 is then guided with objective holder 4 against deformation tool 17, so that standard pins 105.1, 105.2, and 105.3, which until now had the same length, come to lie in stamping depressions 21 and are thermally softened and deformed. As a result, locating pins 5.1, 5.2, and 5.3 are developed at different pin lengths 12.1, 12.2, and 12.3 that correspond to counter-tilting angle β. In addition, this also makes it possible for contact surfaces 18.1, 18.2, and 18.3 of locating pins 5.1, 5.2, and 5.3 to have a suitable shape; in particular they are also not tilted themselves like locating pins 5.1, 5.2, 5.3, but, for example, are developed in the shape illustrated in FIG. 5 and have a central middle insertion region 18.

Receiving depressions 20, which accommodate contact surfaces 18.1, 18.2, and 18.3 by a suitable counter contour, may accordingly be developed in circuit carrier surface 6.1, i.e., receiving depressions 20 may correspond to stamping depressions 21, for example, or be slightly larger for a suitable centered accommodation of insertion regions 19 of contact surfaces 18.1, 18.2, and 18.3. In this development the correct azimuth position is therefore already adjusted, so that it is possible to achieve a form-locking or fitting engagement. The subsequent fixation of locating pins 5.1, 5.2, and 5.3 on circuit carrier surface 6.1 may be accomplished by bonding, for example.

Figure 6:
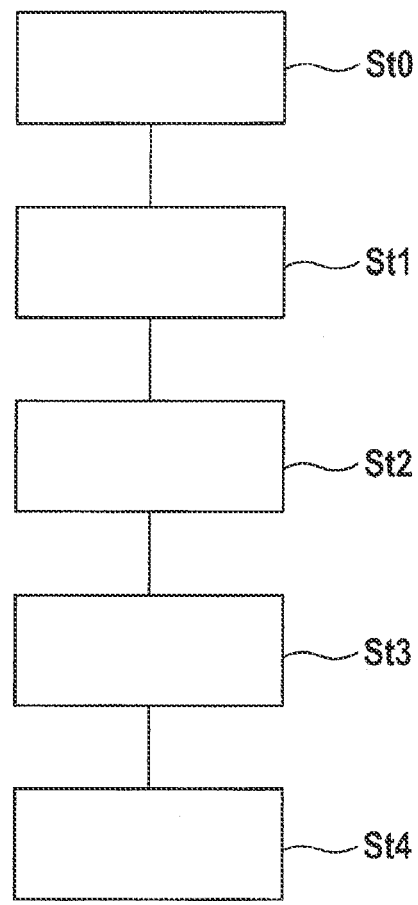
FIG. 6 shows method steps for producing a camera.

FIG. 6 thus shows the production method used for camera 1 in the present invention. To begin with, the initial materials are produced or supplied in step St0, i.e., circuit carrier 6 as a metal plate having a planar circuit carrier surface 6.1, image sensor 7, which is mounted and contacted on circuit carrier 6 in the conventional manner using flexible conduction band 8, as well as objective 2 including lens barrel 2a, lenses and spacer rings between the lenses, and objective holder 4 with its standard pins 105.1, 105.2, and 105.3.

In step St1, objective 2 is subsequently measured following its production and classified, e.g., using classes K1, K2, K3, . . . , featuring tilting angle α and azimuth position or azimuth angle γ.

The development of objective holder 4 according to FIGS. 4 and 5 takes place according to step St2. Thus, a multitude of objective holders 4 according to classes K1, K2, . . . is advantageously developed, so that a suitable objective holder 4 of the particular class K1, K2, . . . of objective 2 measured in step St1 is able to be selected in the production.

In step St3, objective holder 4 is placed on circuit carrier 6 (or also image sensor 7) via its locating pins 5.1, 5.2, 5.3 and fixed in place using an adhesive, for instance, so that axis of symmetry 14 has counter-tilting or counter-tilting angle β with respect to surface normal 13.

In step St4, objective 2 then is inserted into tube 4.3 in a suitable azimuth position or at a suitable azimuth angle γ in assembly direction M; here, the adjustment or focusing advantageously already takes place by shifting objective 2 longitudinally while analyzing image signals Si of image sensor 7 and recording a test pattern.

What is claimed is:

1. A method for producing a camera, comprising:
   providing an image sensor, an objective having an optical axis, a circuit carrier, and a power device;
   mounting the image sensor on the circuit carrier and contacting the image sensor with the power device for the recording of image signals of the image sensor;
   measuring the objective while ascertaining a tilting angle of an optical axis of the objective;
   providing at least one objective holder having a tube and locating pins;
   placing the objective holder with the locating pins on at least one of the circuit carrier and the image sensor;
   inserting the objective in one of a specified rotational position or an azimuth angle into the tube of the objective holder as a function of the ascertained tilting angle; and
   adjusting a focus;
   wherein the objective holder is placed on at least one of the circuit carrier and the image sensor,
   wherein multiple objective holders featuring different counter-tilting angles are provided and allocated to multiple different classes, wherein the objectives are each allocated to one of the multiple classes as a function of the respective ascertained tilting angle, and
   wherein the different classes are specified by the tilting angle and one of (i) an azimuth angle, (ii) a rotation angle about the optical axis, or (iii) an axis of symmetry of the tube of the objective holder.

2. The method as recited in claim 1, wherein an axis of symmetry of the tube of the objective holder features a counter-tilting angle with respect to a surface normal of the image sensor, which is the opposite of the ascertained tilting angle of the objective.

3. The method as recited in claim 2, wherein the locating pins of the objective holder are provided by:
   providing standard pins having the same initial length; and
   subsequently shortening the standard pins to different extents to provide the locating pins.

4. The method as recited in claim 3, wherein the standard pins are shortened in their length by one of a metal-removing method or by deformation.

5. The method as recited in claim 4, wherein:
   the objective holder provided with the standard pins is positioned under one of the tilting angle or the counter-tilting angle with respect to a tool;
   the objective holder and the tool are adjusted to one another while working the standard pins, whereby the locating pins are developed and contact surfaces of the locating pins are formed for subsequent seating on at least one of a circuit carrier surface and the image sensor.

6. The method as recited in claim 2, wherein the objectives, after having been measured, are each allocated to one of the multiple classes as a function of the respective ascertained tilting angle, and wherein a separate objective holder of the same class is allocated to one objective in each case.

7. The method as recited in claim 6, wherein one of the azimuth angle or the rotation angle about the optical axis is adjusted by one of (a) the relative position of the objective holder on one of the circuit carrier or the image sensor, or (b) one of the relative position or the azimuth position of the objective inside the tube of the objective holder.

8. The method as recited in claim 2, wherein the tilting angle of the optical axis of the objective relative to one of a lens barrel or an outer surface of the objective is ascertained.

9. The method as recited in claim 1, wherein, within a predefined tolerance, the counter-tilting angle is the opposite of the tilting angle and has the same magnitude.

10. A camera for a vehicle, comprising:
    a circuit carrier;
    an image sensor mounted on the circuit carrier;
    an objective having an optical axis;
    an objective holder which includes a tube for receiving the objective, a holder region, and locating pins starting from the holder region, the locating pins resting on one of the circuit carrier or the image sensor;
    wherein the optical axis has a tilting angle in relation to an axis of symmetry of the tube, and the axis of symmetry has a counter-tilting angle in relation to a surface normal of the image sensor, the tilting angle and the counter-tilting angle being opposites, for the at least partial compensation of the tilting angle,
    wherein the objective holder is located on at least one of the circuit carrier and the image sensor, and
    wherein the locating pins are of variable pin lengths that correspond to the counter-tilting angle, and
    wherein multiple objective holders featuring different counter-tilting angles are provided and allocated to multiple different classes, wherein the objectives are each allocated to one of the multiple classes as a function of the respective ascertained tilting angle, and wherein the different classes are specified by the tilting angle and one of (i) an azimuth angle, (ii) a rotation angle about the optical axis, or (iii) an axis of symmetry of the tube of the objective holder.

11. The camera as recited in claim 10, wherein three locating pins are provided, which are situated at the underside of the holder region at an offset of approximately 120° in relation to each other, the counter-tilting angle being adjusted by the variable pin lengths of the locating pins.

12. The camera as recited in claim 10, wherein the objective has a mark, and the objective holder has a counter mark for adjusting an azimuth angle.

13. The camera as recited in claim 12, wherein the objective holder is configured as a one-piece component.

14. The camera as recited in claim 12, wherein the image sensor is mounted on the circuit carrier using chip-on-board technology.

15. The camera as recited in Claim 10, wherein the axis of symmetry of the tube of the objective holder features a counter-tilting angle with respect to a surface normal of the image sensor, which is the opposite of the ascertained tilting angle of the objective.

16. The camera as recited in claim 15, wherein the objectives, after having been measured, are each allocated to one of the multiple classes as a function of the respective ascertained tilting angle, and wherein a separate objective holder of the same class is allocated to one objective in each case.

17. The camera as recited in claim 16, wherein one of the azimuth angle or the rotation angle about the optical axis is adjusted by one of (a) the relative position of the objective holder on one of the circuit carrier or the image sensor, or (b) one of the relative position or the azimuth position of the objective inside the tube of the objective holder.

* * * * *